No. 746,674. Patented December 15, 1903.

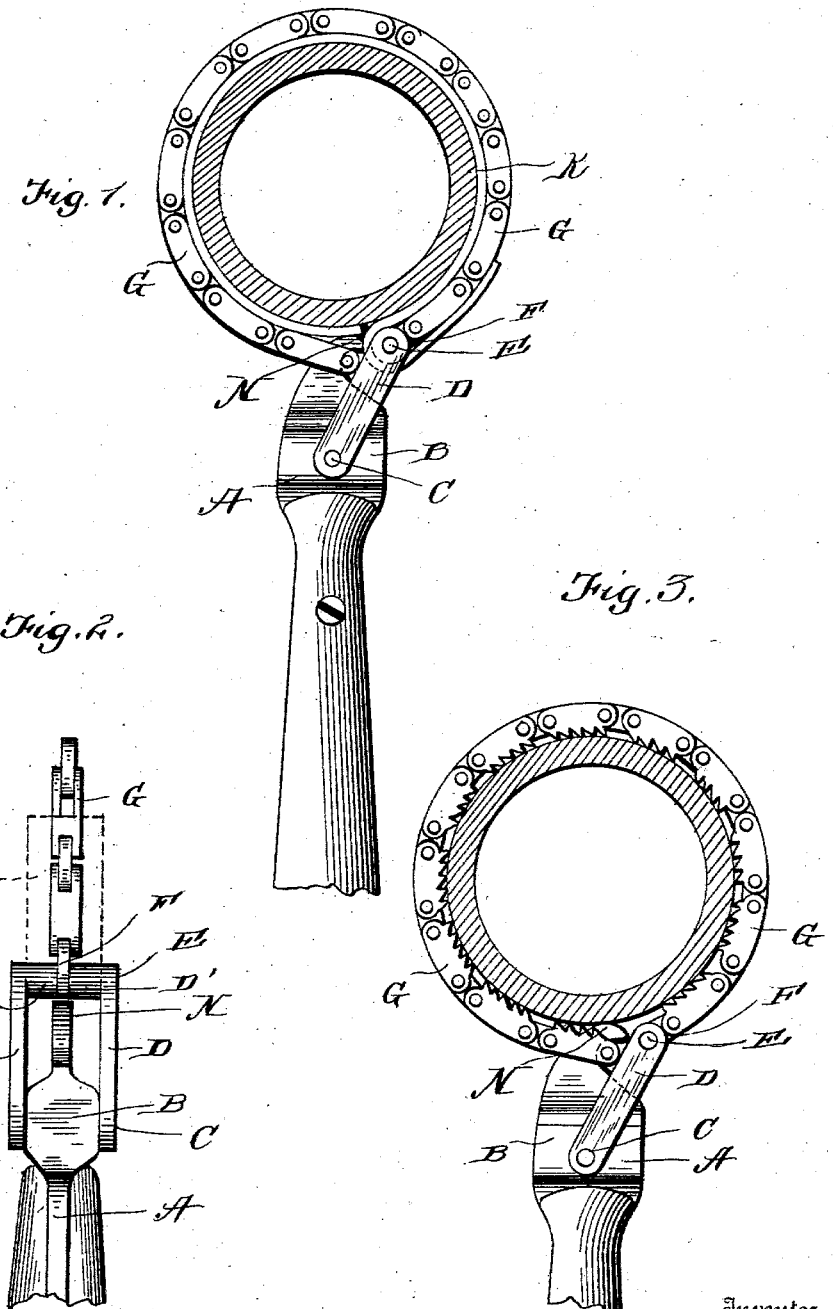

UNITED STATES PATENT OFFICE.

GEORGE R. CHEESMAN, OF AUBURN, NEW YORK.

CHAIN WRENCH.

SPECIFICATION forming part of Letters Patent No. 746,674, dated December 15, 1903.

Application filed September 23, 1903. Serial No. 174,322. (No model.)

*To all whom it may concern:*

Be it known that I, GEORGE R. CHEESMAN, a citizen of the United States, residing at Auburn, in the county of Cayuga and State of New York, have invented new and useful Improvements in Chain Wrenches, of which the following is a specification.

This invention relates to new and useful improvements in wrenches, and especially in a wrench designed especially for use upon pipes, and comprises a chain which is connected at one end to a clevis, the ends of which are pivotally mounted on a pin carried by the head of a cant-hook, the end of which cant-hook is designed to engage a link of the chain and the cam edge of the hook serving as means for turning the pipe, which is tightly gripped by the chain, and affording a great leverage.

The invention relates, further, to a chain wrench having a lever with cant-hook with a clevis to which is connected one end of a chain, and in the provision of a strap of soft material also secured to the clevis and designed to be interposed between the chain and the finished surface of a tubular object to be acted upon by the wrench, thereby preventing the surface from becoming injured.

The invention consists, further, in other details of construction, combination of parts, and arrangements of features, which will be hereinafter fully described and then specifically defined in the appended claim.

My invention is clearly illustrated in the accompanying drawings, which, with the letters of reference marked thereon, form a part of this application, and in which drawings similar letters of reference indicate like parts in the various views, in which—

Figure 1 is a view in side elevation showing the manner of engagement of the chain with a pipe. Fig. 2 is an edge view of the wrench, showing the shape of the head of the cant-hook and clevis connected thereto. Fig. 3 is a side elevation showing a slight modification of the wrench, adapting same for use on heavy coarse work and showing the strap of soft material dispensed with and the links of the chain provided with teeth in order to form a better grip upon the pipe or other object to be operated upon.

Reference now being had to the details of the drawings by letter, A designates a metallic bar forming a suitable lever, and is provided with a head B, carrying a pivot-pin C. D D designate links which are pivotally mounted at their inner ends on said pin C and have integral cylindrical-shaped lugs D' disposed toward each other on the opposite ends of said links and spaced apart. A pin E passes through registering apertures in said lugs, and on which pin an end link F of a chain G is pivotally mounted. A strap K, preferably of leather, is fastened to the link of the chain, which is pivotally connected to the pin C and passes about said cylindrical-shaped lugs D', and is designed to be of a width equal to the width of the chain and is interposed between the chain and the object to be acted upon by the wrench for the purpose of preventing the object from being marred, which would be the case were the two metallic surfaces to come in contact with each other. Projecting from said head is a cant-hook N, which is narrow in order to allow said hook to enter the links of the chain to get a hold on the pivotal pins of a chain, and the rear edge of the hook is cam-shaped and is adapted to contact with the pivot-pin at the opposite ends of the links engaged by the free end of the hook, thus serving to throw the link forcibly against the object to be acted upon as the lever is thrown in one direction or the other.

In Fig. 3 I have shown the leather strap dispensed with and teeth on the edges of the links which engage the object to be operated upon in order to give a tight grip. This modification is designed for coarse work.

By the provision of the peculiar construction of my invention it will be observed that an immense leverage is obtained by the cant-hook arrangement for engagement with pivot-pins of the links, and the chain may be held tightly against the object to be acted upon.

While I have shown and described a particular construction of device embodying my improved chain wrench, it will be understood that I may make alterations in the detailed construction of the same without departing from the spirit of the invention.

Having thus described my invention, what I claim to be new, and desire to secure by Letters Patent, is—

A chain wrench, comprising a lever having a head with an integral cam-shaped, cant-hook, links pivotally mounted on said head, the outer ends of said links having cylindrical-shaped lugs disposed toward each other and spaced apart, a pin passing through registering apertures in said lugs, a chain made up of links with pivotal-pin connections, one end of said chain pivotally connected to the pin passing through said lugs, said hook being adapted to engage a pin at the end of a link, while the cam edge of the hook is designed to bear against the pin at the other end of the link, as set forth.

In testimony whereof I have signed my name to this specification in the presence of two subscribing witnesses.

GEORGE R. CHEESMAN.

Witnesses:
SIDNEY J. WESTFALL,
CICERO J. WARNE.